June 27, 1933.  A. HIRSCHMAN  1,915,996
BRAKE RELEASE ATTACHMENT FOR MOTOR VEHICLES
Filed May 16, 1928  2 Sheets-Sheet 1
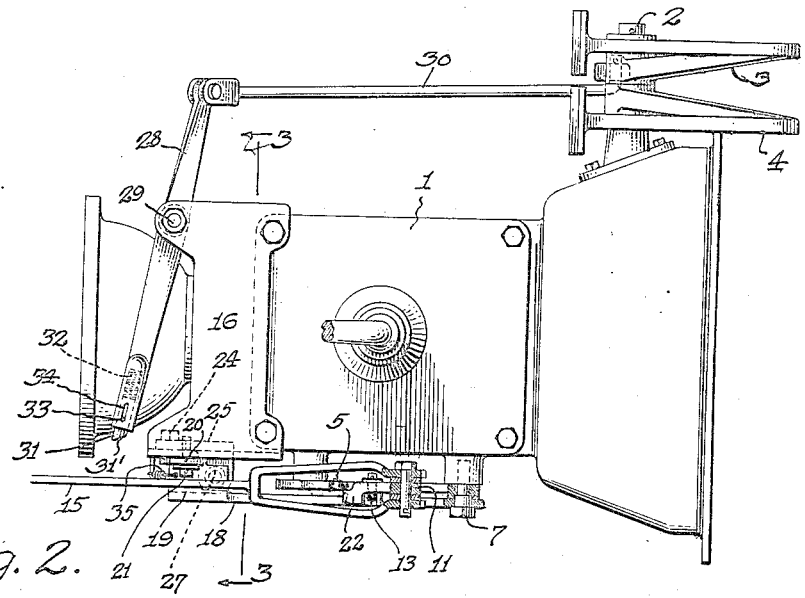
Fig. 2.
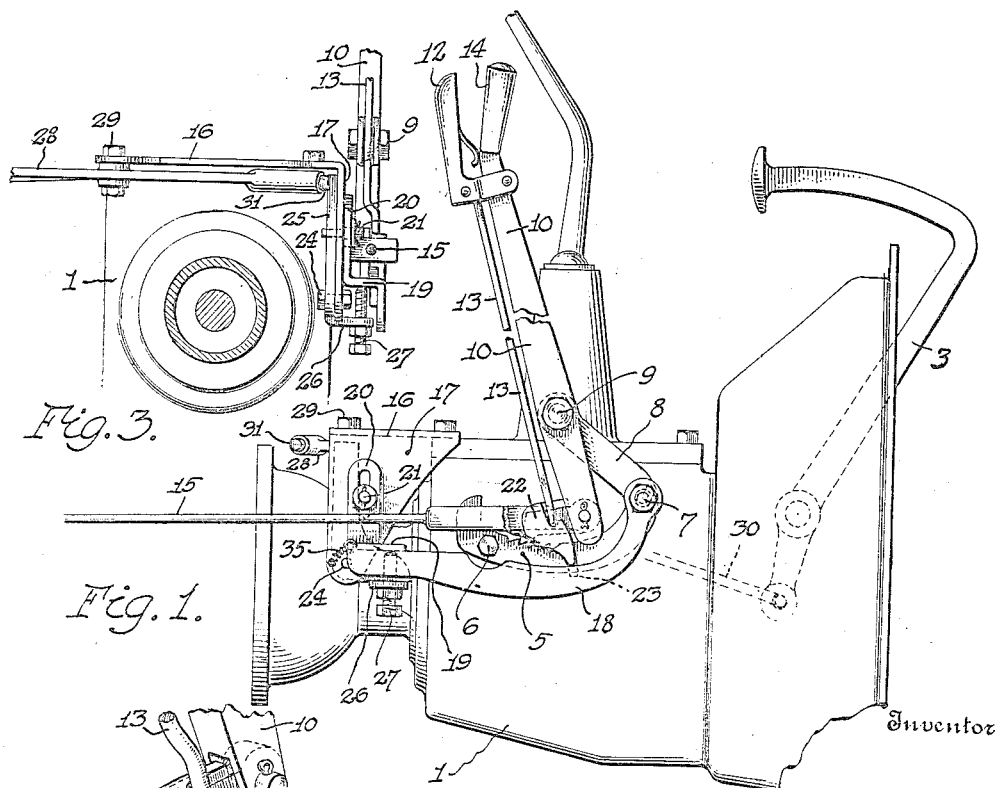
Fig. 3.
Fig. 1.
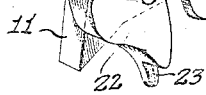
Fig. 4.
Inventor
Arthur Hirschman,
By
Attorneys June 27, 1933.   A. HIRSCHMAN   1,915,996
BRAKE RELEASE ATTACHMENT FOR MOTOR VEHICLES
Filed May 16, 1928   2 Sheets-Sheet 2.

Inventor
Arthur Hirschman,
By
Attorneys

Patented June 27, 1933

1,915,996

UNITED STATES PATENT OFFICE

ARTHUR HIRSCHMAN, OF DETROIT, MICHIGAN, ASSIGNOR TO AUTO SAFETY BRAKE, INC., OF DETROIT, MICHIGAN, A CORPORATION OF MICHIGAN

BRAKE RELEASE ATTACHMENT FOR MOTOR VEHICLES

Application filed May 16, 1928. Serial No. 278,138.

The present invention pertains to a novel brake release attachment for motor vehicles having the same general objects as the devices shown in my patents, No. 1,520,818 of December 30, 1924, and No. 1,567,440, of December 29, 1925, and involving various improvements and simplifications of these devices.

Although the objects of the invention are described in these patents, it may be stated that the invention provides a mechanism whereby the hand or emergency brake is automatically released when the clutch pedal is retracted after depression. Such operation is particularly useful when it is necessary to stop the vehicle on a hill, for if the foot brake alone is relied upon, the vehicle will roll while the operator is shifting his right foot from the brake pedal to the accelerator. A similar interval occurs between the release of the brake and the forward drive if the hand brake is used in such cases. With the invention applied to a motor vehicle, the hand brake lever may be drawn up in cases such as that described, and the emergency brake is automatically released during the shifting of gears and the necessary actuation of the clutch pedal preparatory to starting. The construction of the device is such that the emergency brake is not released until the clutch pedal is permitted to retract after being pushed inwardly, so that the emergency brake remains applied until the motor vehicle drive has been put into gear.

Another feature of the invention is that it avoids the "on" position of the emergency brake through inadvertence while driving, as often occurs to the serious detriment of the brake mechanism. It will be obvious that this situation cannot occur where the present invention is provided, inasmuch as the first retraction of the clutch pedal after putting the drive mechanism into gear automatically releases the emergency brake.

The invention is fully disclosed by way of example in the following description and in the accompanying drawings, in which—

Figure 5:
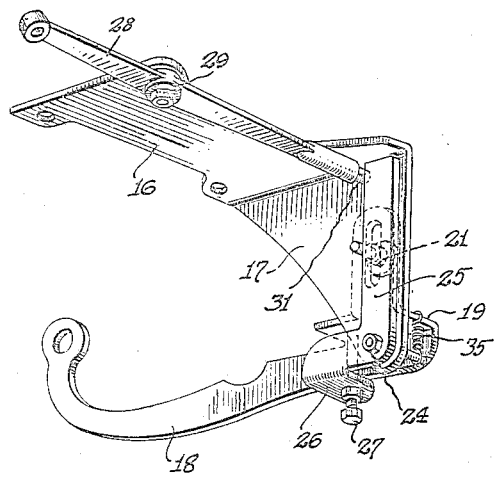

Figure 1 is a side elevation of a transmission casing, showng the invention applied thereto;

Fig. 2 is a plan view thereof;
Fig. 3 is a section on the line 3—3 of Figure 2;
Fig. 4 is a detail perspective view of the dog and pawl carried thereby;
Fig. 5 is a perspective view of the attachment from the rear side thereof; and
Fig. 6 is a side elevation similar to Figure 1, showing the position of parts when the pawl of the emergency brake lever is released from its rack by the mechanism.

Reference to these views will now be made by use of like characters which are employed to designate corresponding parts throughout.

Figure 6:
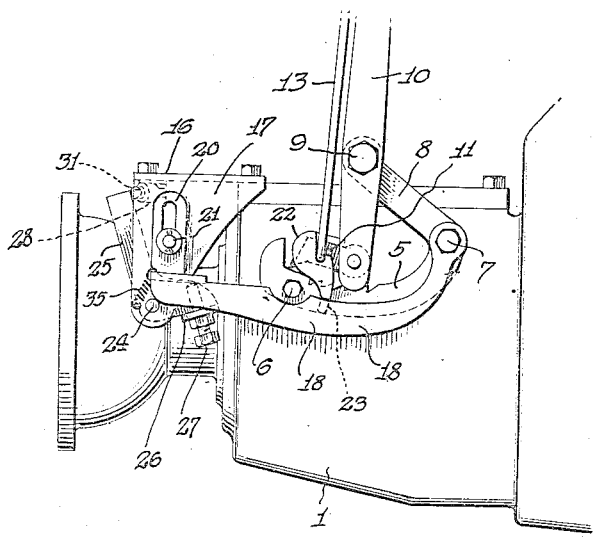

Figures 1, 2 and 6 illustrate a conventional transmission casing 1 supporting a pedal shaft 2 to which are secured the usual clutch pedal 3 and brake pedal 4. To one side of the casing is fixed a somewhat curved rack 5 at two points 6 and 7. The rack bar has an upward and angular extension 8 to the free end of which is pivoted, as at 9, the usual emergency or hand brake lever 10 at an intermediate point of the latter. To the lower end of the lever is pivotally connected a dog 11 adapted for engagement in the teeth of the rack 5. A hand grip 12 is pivotally attached near the upper end of the lever 10 and is joined by a link 13 to the pivoted dog 11. A spring 14 between the grip 12 and the upper end of the lever 10 acts to depress the link and dog, so that in pulling the brake lever to the position shown in Figure 1 in order to apply the emergency brake, it is necessary to press the grip 12 towards the handle of the lever, so that the dog 11 may be raised and thus permitted to ride over the rack. When the end position is reached, the grip 12 is released whereby the spring 14 causes the dog to engage the rack.

To the lower end of the lever 10 is also connected a link 15, the movement of which actuates the emergency brakes in the usual manner. Across the top of the transmission casing is secured a right angular bracket 16 having a vertical side 17 disposed beside the transmission casing near to the same vertical plane of the brake mechanism already described. To the pivot point 7 is also attached one end of a lifting arm 18 having its free or swinging end offset inwardly towards the transmission casing as at 19 and then formed with an upwardly extending slotted portion 20 which receives a stud 21 secured to the bracket side 17. To the dog 11 is attached a pawl or shield 22 having its lower end notched at 23 for receiving the upper edge of the lifting bar 18.

It will be apparent that if the lifting bar is raised while the brake is applied as in Figure 1, the dog 11 will be lifted from the rack 5 and the brake lever will be returned to release position by the usual spring normally acting on the link 15 to draw the same rearwardly. Such lifting mechanism operable by the clutch pedal 3 is provided, and will now be described.

To the inner face of the bracket side 17 is pivotally attached, as at 24, a rocker arm 25 having its lower end formed with a horizontal ear 26 in which is mounted an adjustable set screw 27 adapted to engage the offset portion 19 of the lifting bar 18, as shown more clearly in Figure 3. The swinging of the rocker arm 25 is accomplished by another rocker arm 28 pivoted at 29 to the remote corner of the horizontal part of the bracket 16. One end of this rocker arm is in line with the brake pedal 3 and is joined to the lower end of the latter by a link 30. The free or swinging end of the rocker arm 28 carries a slidable finger 31 normally projected by a spring 32 but held against detaching itself from said end by means of a pin 33 carried thereby and working in a slot 34 formed in said end. A small coil spring 35 connects the horizontal part 19 of the lifting arm 18 to the lower corner of the bracket 17 in order to prevent the mechanism from rattling, and returning the lifting arm 18 and rocker arm 25 to normal position.

The operation of the device will now be described. If we assume that the brake lever 10 is in locking position as in Figure 1 and that the clutch pedal 3 is depressed, the swinging end of the rocker arm 28 will be moved in a forward direction. The slidable finger 31 will ride over the rocker arm 25, this movement being facilitated by the beveled outer end 31' of the finger and by the spring 32, and the finger will take a position in front of the rocker 25. When the clutch pedal 3 is allowed to retract, the swinging end of the rocker arm 28 will move rearwardly, and the finger 31 will turn the rocker arm 25 on its pivot so that the parts 26 and 27 will be raised. This movement raises the lifting arm 18 on its pivot and releases the dog 11 from the rack 5 in the manner already described, whereupon the brake lever 10 is returned to release position by the spring acting thereon.

If reference will now be made to the objects of the invention, it will be seen that the mechanism herein described accomplishes such objects, inasmuch as the actuation of the clutch pedal operates the mechanism in such a manner as to release the emergency brake. In the usual operation of the clutch pedal while the emergency brake is released, the rocker arm 28 will merely swing on its pivot, with no effect on the brake releasing mechanism.

Although a specific embodiment of the invention has been illustrated and described, it will be understood that various alterations in the details of construction may be made without departing from the scope of the invention as indicated by the appended claims.

What I claim is:

1. In combination with a brake lever, a rack, and a dog carried by said lever and engageable with said rack; a lifting member adapted to lift said dog from the rack, a rocker arm adapted to raise said lifting member, a second rocker arm swingable in a plane perpendicular to said first named rocker arm and adapted to actuate the same, and means for connecting said second rocker arm to a clutch pedal.

2. In combination with a brake lever, a rack, and a dog carried by said lever and engageable with said rack; a pawl carried by said dog, a lifting member adapted to raise said pawl and dog to release said dog from said rack, a rocker arm adapted to raise said lifting member, a second rocker arm swingable in a plane perpendicular to said first named rocker arm and adapted to actuate the same, and means for connecting said second rocker arm to a clutch pedal.

3. In combination with a brake lever, a rack, and a dog carried by said lever and engageable with said rack; a lifting member adapted to raise said dog, and a rocker arm adapted for actuation by a clutch pedal and having a free swinging end movable in a path occupied by said lifting member, and displaceable means carried by said end and adapted to freely pass said lifting member in one direction and to engage and carry said lifting member when swinging in the other direction.

4. The combination of a vehicle brake operating lever, means for retaining the lever in brake engaging position, means for releasing said retaining means, and operating means operable from an operating member on the vehicle for operating said releasing means and including a yieldable portion having a formed surface thereon whereby said releasing means may freely move past said operating means in one direction, said yieldable portion having a flat surface thereon engageable with said releasing means to move with said operating means upon operation of said releasing means in the other direction.

In testimony whereof I affix my signature.

ARTHUR HIRSCHMAN.